United States Patent
Baumer et al.

(10) Patent No.: US 9,400,050 B2
(45) Date of Patent: Jul. 26, 2016

(54) METHOD FOR SWITCHING A HYBRID DRIVE FROM ONE OPERATING MODE TO ANOTHER OPERATING MODE, AND A HYBRID VEHICLE

(71) Applicant: Bayerische Motoren Werke Aktiengesellschaft, Munich (DE)

(72) Inventors: Klaus Baumer, Munich (DE); Julian Rothfuss, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/307,093

(22) Filed: Jun. 17, 2014

(65) Prior Publication Data

US 2014/0290421 A1    Oct. 2, 2014

Related U.S. Application Data

(63) Continuation of application No. PCT/EP2013/052632, filed on Feb. 11, 2013.

(30) Foreign Application Priority Data

Mar. 7, 2012 (DE) .......................... 10 2012 203 584

(51) Int. Cl.
*B60W 50/08* (2012.01)
*F16H 59/10* (2006.01)
(Continued)

(52) U.S. Cl.
CPC *F16H 59/10* (2013.01); *B60K 6/48* (2013.01); *B60K 20/00* (2013.01); *B60W 50/082* (2013.01);
(Continued)

(58) Field of Classification Search
CPC ... F16H 59/0204; F16H 59/10; F16H 59/105; F16H 2059/082; F16H 2059/084; F16H 2059/0221; B60W 50/082; B60W 2540/16; B60W 20/00; B60K 6/48; B60K 20/00; Y10T 74/20396; Y10T 10/6221
See application file for complete search history.

(56) References Cited

U.S. PATENT DOCUMENTS 5,885,187 A    3/1999 Tabata
6,503,170 B1*  1/2003 Tabata ................ F16H 59/0204
                                                          475/254
(Continued)

FOREIGN PATENT DOCUMENTS

CN    1305908 A    8/2001
CN    101571189 A   11/2009
(Continued)

OTHER PUBLICATIONS

Corresponding International Search Report dated Apr. 29, 2013 with English Translation (six (6) pages).
(Continued)

*Primary Examiner* — Paul N Dickson
*Assistant Examiner* — Steve Clemmons
(74) *Attorney, Agent, or Firm* — Crowell & Moring LLP

(57) ABSTRACT

A method is provided for switching a drive of a hybrid vehicle from one operating mode to another operating mode. The drive includes an internal-combustion engine, at least one propulsion-generating electric machine and a transmission. The transmission can be shifted by a selecting device to be actuated by a driver into different operating states. The operating modes are distinguishable according to the ratio of drive power generated by the electric motor to the drive power generated by the internal-combustion engine. The drive is controlled by a drive control unit as a function of a drive prompt specified by the driver by an accelerator element and the selecting device, and according to different drive state and/or vehicle parameters. The drive is switchable from one operating mode to another operating mode by actuating the selecting device.

10 Claims, 2 Drawing Sheets

(51) Int. Cl.
  *B60K 6/48* (2007.10)
  *B60K 20/00* (2006.01)
  *F16H 59/02* (2006.01)
  *B60W 20/00* (2016.01)
  *F16H 59/08* (2006.01)

(52) U.S. Cl.
  CPC ............ *F16H 59/0204* (2013.01); *B60W 20/00* (2013.01); *B60W 2540/16* (2013.01); *F16H 59/105* (2013.01); *F16H 2059/0221* (2013.01); *F16H 2059/082* (2013.01); *Y02T 10/6221* (2013.01); *Y10T 74/20396* (2015.01)

(56) References Cited

U.S. PATENT DOCUMENTS

| | | |
|---|---|---|
| 8,485,061 B2 | 7/2013 | Kliemannel et al. |
| 2004/0225430 A1 | 11/2004 | Bothe et al. |
| 2010/0107798 A1 | 5/2010 | Sickart |
| 2010/0311539 A1 | 12/2010 | Eisele |
| 2013/0333517 A1* | 12/2013 | Osuka .................... B60K 6/48 74/661 |

FOREIGN PATENT DOCUMENTS

| | | |
|---|---|---|
| CN | 101680536 A | 3/2010 |
| DE | 100 59 279 A1 | 6/2001 |
| DE | 101 57 393 A1 | 6/2003 |
| DE | 10 2007 015 375 A1 | 10/2008 |
| DE | 10 2008 022 561 A1 | 11/2009 |
| DE | 10 2009 026 788 A1 | 12/2010 |
| EP | 2 492 161 A1 | 8/2012 |
| WO | WO 2011/048636 A1 * | 4/2011 |

OTHER PUBLICATIONS

Chinese Office Action issued in Chinese counterpart Application No. 201380004061.9 dated Nov. 4, 2015, with English translation (Twelve (12) pages).

* cited by examiner

METHOD FOR SWITCHING A HYBRID DRIVE FROM ONE OPERATING MODE TO ANOTHER OPERATING MODE, AND A HYBRID VEHICLE

CROSS REFERENCE TO RELATED APPLICATIONS

This application is a continuation of PCT International Application No. PCT/EP2013/052632, filed Feb. 11, 2013, which claims priority under 35 U.S.C. §119 from German Patent Application No. 10 2012 203 584.2, filed Mar. 7, 2012, the entire disclosures of which are herein expressly incorporated by reference.

BACKGROUND AND SUMMARY OF THE INVENTION

The present invention relates to a method for switching a drive of a hybrid vehicle from one operating mode to another operating mode, as well as to a hybrid vehicle for carrying out the method.

It is known that so-called "full-hybrid vehicles" are distinguished by a drive which has an internal-combustion engine and at least one propulsion-generating electric machine. A full-hybrid vehicle can be operated in different operating modes, which modes differ according to the "ratio of driving power generated by an electric motor to driving power generated by an internal-combustion engine". The vehicle can, for example, be driven:

in a first operating mode, exclusively by an internal-combustion engine,
in a second (hybrid) operating mode, by an internal-combustion engine and simultaneously by an electric motor, or
in a third operating mode, exclusively by an electric motor.

In the case of conventional hybrid concepts, it is possible for the driver to select a certain operating mode, such as "exclusively electric driving", for example, by pressing a button provided in the instrument panel area or by selecting a corresponding function in a selection menu. If permitted by the momentary driving state and/or vehicle parameters (for example, vehicle velocity, charge state of the battery, etc.), the driver can actively, i.e. by himself, change to a certain operating mode. However, the pressing of a button and particularly the selecting of a function by way of a possibly relatively complex menu structure, require that the driver be highly observant, which can be problematic depending on the driving situation.

It is an object of the invention to provide a method for switching a hybrid drive from one operating mode to another operating mode, as well as a correspondingly developed hybrid vehicle, in which the change-over can be initiated by the driver as intuitively as possible.

The starting point of the invention is a hybrid vehicle having a drive which has an internal-combustion engine, at least one propulsion-generating electric machine and a transmission which can be shifted into different operating states by way of a "selecting device" to be actuated by a driver. The electric machine (motor) can particularly be designed such that an exclusively electric driving (i.e. without a combustion-engine drive) is also possible.

The hybrid drive can be operated in at least two, and preferably in at least three, different operating modes, for example:

as an "exclusive internal-combustion engine drive",
as a "hybrid drive" (i.e. simultaneous internal-combustion engine drive and electric motor drive),
as an exclusive electric motor drive.

The individual operating modes can be differentiated according to the "ratio of driving power generated by an electric motor to driving power generated by an internal-combustion engine". Naturally, in the case of the exclusive internal-combustion engine drive mode, the fraction of the driving power generated by the electric motor will be zero. In the hybrid drive, the ratio of driving power generated by the electric motor to driving power generated by the internal-combustion engine may vary in a certain range. Naturally, in the case of an exclusively electric motor drive, the fraction of internal-combustion engine driving power will be zero.

The terms "operating mode" or "operating modes" should be interpreted very broadly. As an alternative to the above-described example, several different hybrid operating modes are, for example, also contemplated. Therefore, the at least two operating modes do not necessarily have to comprise an exclusively electric-motor driving mode or an exclusively internal-combustion engine driving mode.

The "drive" of such a hybrid vehicle has a plurality of control parameters (including marginal conditions), such as, for example, the power to be momentarily generated by the internal-combustion engine, the power to be momentarily generated by the electric machine, the power to be momentarily recuperated by the electric machine, the shifting state of the transmission etc. These control parameters are controlled by a drive control (one or more electronic control units having corresponding software programs).

Simply stated, the drive control controls the drive as a function of a "drive prompt" specified by the driver by way of:

the "accelerator element" (for example, the accelerator pedal) and
the transmission selecting device (for example, the gear selector lever or the gear selecting switch), and, as a function of different driving state and/or vehicle parameters or marginal conditions. The driving state parameters include, for example, the vehicle velocity and/or the charge state of the electric energy storage device (battery or capacitor arrangement) supplying the electric machine.

In accordance with the invention, by activating an element already present in the vehicle anyhow, such as the selecting device (for example, the gear selecting switch or transmission selector lever), by which the transmission can be switched into its different operating states, the "drive" can very easily be actively switched by the driver from one operating mode (for example, the hybrid operating mode) to another operating mode (for example, the exclusively electric driving mode). The state selected by the driver or the shifting position of the selecting device selected by the driver therefore defines the momentary operating mode of the drive if permitted by the momentarily present driving state and/or vehicle parameters or marginal conditions.

Compared to conventional hybrid vehicles, where a switching from one operating mode to another operating mode takes place by way of a button or switch provided in the area of the instrument panel or at the steering wheel or by selecting a function from a software menu structure, a (mere) actuating of the selecting device, by which the individual operating positions of the transmission can also be selected, is absolutely also possible intuitively, while the driver can keep his eyes on the road. This novel difference from that of conventional hybrid vehicles is extremely advantageous ergonomically and has a direct positive effect on driver acceptance in the case of hybrid vehicles.

According to the invention, the drive is in a first operating mode when the selecting device is in a first (stable) state, and in a second operating mode when the selecting device is in a second (stable) state. The stable states may, for example, be defined shifting positions which a selector lever can assume, by way of which selector lever the transmission can be controlled.

It is explicitly pointed out that the invention provides or makes possible a switching-over between individual operating modes initiated by the driver which, however, does not exclude that, in certain situations, the drive control switches over automatically, i.e. without any action by the driver, from one operating mode to another operating mode.

In the case of a switching-over of the drive from one operating mode to another operating mode initiated by the drive control, for example, in the case of a switching-over from an exclusive electric-motor drive to a hybrid drive or to an exclusive internal-combustion drive, it may be provided that, in this case, the selecting device is also switched "automatically", i.e. without any assistance by the driver. In this context, "automatic" means that the selecting device is shifted by the vehicle electronic system (drive control). From the shifting position of the selecting device and of a shifting noise possibly connected with the shifting of the selecting device, the driver therefore immediately receives a visual, haptic and/or acoustic acknowledgment concerning the (automatically implemented) change of the operating mode.

In addition, in the case of such a shifting operation, for example, in an instrument cluster, a change of the operating mode can be indicated by way of a display centrally arranged in the area of the instrument panel and/or by way of a so-called head-up display.

Furthermore, a visual status indication (for example, an LED or the like) may be provided at the selecting device (for example, at the selector lever) or in a different location in the driver's visual range, which indicates the momentarily selected operating mode.

An automatic switching from the exclusive internal-combustion engine drive to a hybrid mode or to an exclusive electric machine engine mode can be initiated by the driver, for example, by depressing the accelerator pedal ("kickdown"). A corresponding switching signal is supplied to the drive control. The drive control will then change the operating mode, which is accompanied by an automatic shifting of the selecting device or of the gear selector lever. If the driver's intention exceeds the exclusively electrically achievable maximum speed, it may also be provided that the exclusively electric driving mode is automatically exited.

As mentioned above, the selecting device may be a swivellably or tiltably arranged selector lever, similar to the selector lever found in the case of conventional vehicles with an automatic transmission of the BMW make. According to the present invention, such a selector lever can assume at least two stable states or selector lever positions. When the drive is in a first operating mode (for example, the hybrid operating mode), the selector lever is in an assigned first selector lever position. When the drive is in a second operating mode (for example, an exclusive electric motor drive), the selector lever is in a second selector lever position that differs from the first selector lever position.

It may further be provided that the selector lever can assume a third stable position, from which the transmission can be shifted in steps in a step shift gate into a higher or into a lower gear by actuating the selector lever.

Naturally, more than three stable selector lever positions may also be provided.

It may further be provided that a step-by-step shifting of the transmission by operating the selector lever from the position in which the drive is situated in an exclusive electric motor operating mode is impossible or is prevented.

When a certain operating mode (for example, an exclusive electric motor drive) is not possible in the case of the momentarily given driving state and/or vehicle parameters, it may be provided that the corresponding selection position is blocked; i.e., for example, that the selector lever cannot be moved into the position assigned to the corresponding operating mode.

As an alternative, an "earmarking" of the desired operating mode can be permitted, in that, although the selecting device can be moved into the corresponding selection position, a shifting into the desired operating mode is prevented as long as the momentarily given driving state and/or vehicle parameters do not yet allow it. Such an "earmarked state" may be displayed, for example, by a flashing of a status display (LED or the like). A change into the "earmarked operating mode" can then take place when this is permitted by the momentary driving state and/or vehicle parameters.

It may, for example, be provided that the three stable positions, which the selector lever can assume, are situated in a shift gate—viewed in the driving direction—one behind another or side-by-side (i.e. side-by-side being behind one another in the transverse direction of the vehicle). In this case, the selector lever, starting from the first stable position, which corresponds, for example, to a hybrid operating mode, by moving the selector lever in a first direction, can be shifted into another operating mode (for example, exclusive electric motor operation) and, by moving the selector lever in a second direction opposite the first direction or in a second direction perpendicular to the first direction, can be shifted into a third operating mode (sporty operation or exclusive internal-combustion engine drive).

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
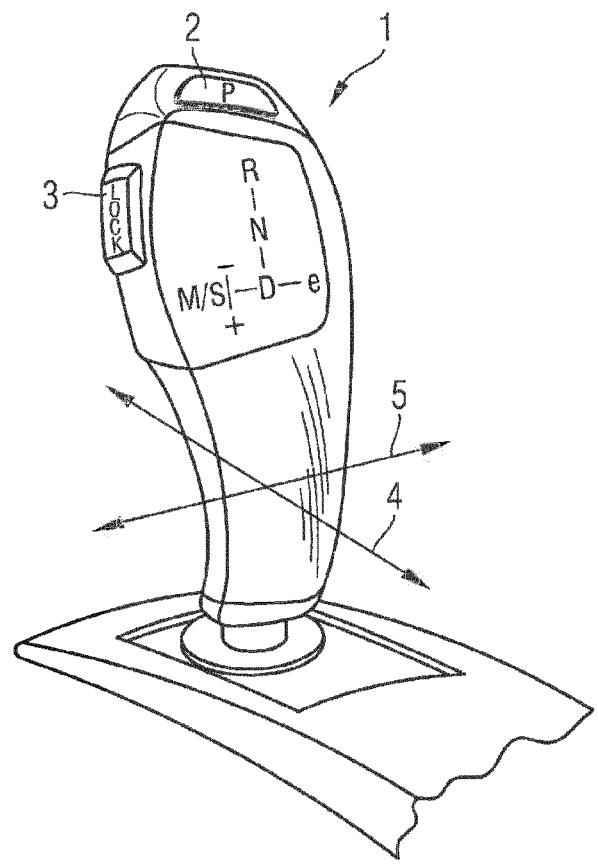
FIGS. 1 to 3 are views of various selector levers by which the individual operating modes of the drive can be selected.

FIG. 1 illustrates a selector lever 1, similar to that installed in conventional vehicles of the BMW make. In its upper area, the selector lever has a button 2 labeled P. When the button 2 is pressed while the vehicle is stationary or is rolling at a low speed, the parking brake will be engaged. An additional button 3 labeled "Lock" is situated on the side of the selector lever 1. If the parking brake is engaged and one wants to change to the driving state, first the brake and simultaneously the button 3 should be depressed. Subsequently, the selector lever 2 can be swiveled in a longitudinal direction 4 of the vehicle.

On the side of the selector lever facing the driver, a shifting gate is schematically applied with the shifting positions "R" (reverse), "N" (neutral) or idling, "D" (forward) situated one behind another in the longitudinal direction 4 of the vehicle.

In the case of a hybrid vehicle, the shifting position "D" represents a hybrid mode in which, if permitted by the driving state and/or vehicle parameters, the vehicle is driven simultaneously by the internal-combustion engine and the electric motor. It may further be provided that, in the case of certain driving state and/or vehicle parameters, the vehicle is driven exclusively by the electric motor also in the "D" position; for example, during very slow driving (speed lower than a specified speed) and when permitted by the charge state of the electric energy storage device.

By swiveling the selector lever 1 toward the right, i.e. in the transverse direction of the vehicle, if permitted by the momentary driving state and/or vehicle parameters, a change can take place into an "e-driving mode", in which the vehicle is driven exclusively by the electric motor.

When the driver selects the exclusive electric driving mode, it may be provided that the selector lever 1 remains in the corresponding position deflected toward the right. If the driving state and/or vehicle parameters change such that an exclusively electric driving operation is no longer possible, it can be provided that a drive control automatically switches back into the hybrid driving mode. In the case of such an automatically controlled operating mode change, it may be provided that the selector lever is automatically swiveled from its selector lever position deflected to the right back into the center position to the left.

Starting from the hybrid driving mode, which corresponds to the selector lever position "D", the selector lever 1 can additionally be deflected to the left into a sporty driving mode. Starting from this selector lever position deflected to the left, which may also be a stable selector lever position, by the swiveling of the selector lever toward the front or opposite the driving direction toward the rear, the transmission can be manually shifted down or shifted up in steps. In the "sporty mode", it may be provided that the vehicle is driven exclusively by the internal-combustion engine or primarily by the internal-combustion engine and driven only in a boosting fashion by the electric motor.

Figure 2:
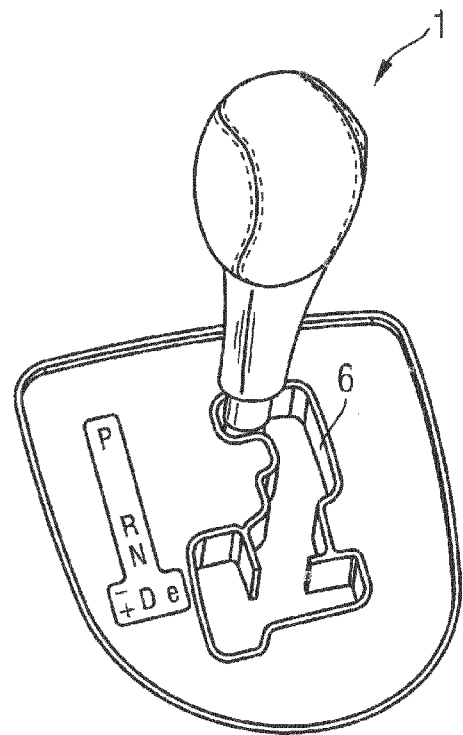

FIG. 2 illustrates an alternative embodiment of a selecting device 1, in which case a true mechanical gate is provided, within which the selector lever 1 can be moved. Here also, three different operating modes can be selected by way of the selector lever, specifically a sporty or step-by-step shifting mode, characterized by the symbols +/−, a hybrid driving mode, characterized by the symbol D, as well as an exclusive electric driving mode, characterized by the symbol e.

As in the case of most conventional vehicles, the selecting elements illustrated in FIGS. 1 and 2 are arranged in the area of the center console of the passenger compartment.

Figure 3:
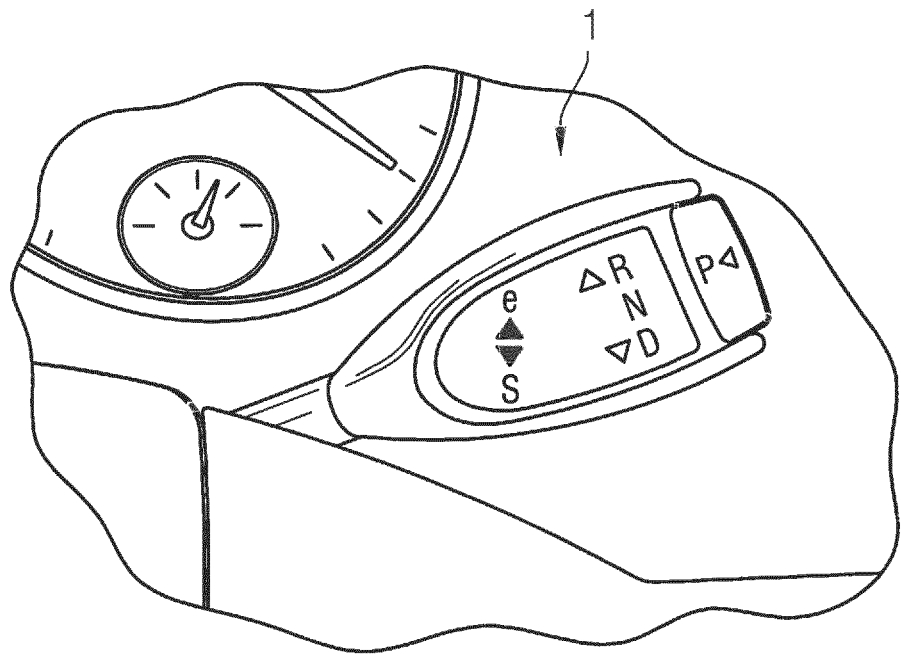

As an alternative, a selector lever according to the invention may also be designed as a steering gear arm which projects radially from the axis of rotation of the steering wheel. Such a steering gear arm 1 *a* is illustrated in FIG. 3.

Figure 4:
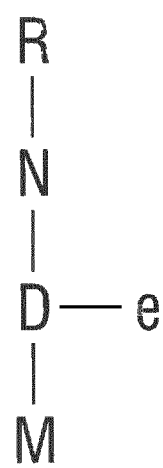
FIG. 4 is a schematic view of a further shifting diagram according to an embodiment of the invention.

FIG. 4 illustrates a shifting diagram for a selector lever (not shown). The selector lever positions assigned to the operating states R (reverse driving), N (idling or neutral), D (forward driving in the automatic mode) and M (forward driving in the manual mode or in the sports mode) are situated in a row (in the driving direction of the vehicle) behind one another. The selector lever position for shifting into the exclusive electric drive mode branches off at the selector lever position D transversely toward the right from the "R-N-D-M shifting gate".

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for switching a drive of a hybrid vehicle from a first operating mode to a second operating mode, the drive comprising an internal combustion engine, at least one propulsion-generating electric machine, and a transmission switchable to various operating states via a selecting device actuated by a driver, the method comprising the acts of:
   providing operating modes distinguishable according to a ratio of drive power generated by the electric machine to drive power generated by the internal combustion engine;
   controlling, via a drive control unit, the drive as a function of a drive command given by a driver via an accelerator element and the selecting device, and according to various driving state parameters and/or vehicle parameters;
   actuating the selecting device to switch the drive from one operating mode to another operating mode, wherein the vehicle is in the first operating mode when the selecting device is in a first stable state and is in the second operating mode when the selecting device is in a second stable state;
   automatically switching from the second operating mode to the first operating mode without any action of the selecting devices by the driver; and
   shifting the selecting device from the second stable state into the first stable state upon the automatic switching from the second operating mode to the first operating mode.

2. A hybrid vehicle, comprising:
   a drive comprising an internal-combustion engine and at least one propulsion-generating electric machine, the drive being operable in at least two different operating modes that are distinguishable according to a ratio of drive power generated by the electric machine to the drive power generated by the internal-combustion engine;
   a selecting device actuatable by a driver;
   a transmission shiftable into different operating states via the selecting device;
   a drive control unit operatively configured to control the drive according to a drive command given by a driver via an accelerator element and the selecting device, and according to various driving state parameters and/or vehicle parameters,
   wherein
      the drive control unit shifts the drive from one operating mode to another operating mode upon the selecting device being actuated,
      the drive is in a first operating mode when the selecting device is in a first stable state,
      the drive is in a second operating mode when the selecting device is in a second stable state, and
      during a change-over of the drive from the second operating mode to the first operating mode initiated by the drive control unit without any action of the selecting device by the driver, the drive control unit shifts the selecting device from the second stable state to the first stable state.

3. The hybrid vehicle according to claim 2, wherein
   the selecting device comprises a swivelable or tiltable selector lever,
   the first stable state corresponds to a first stable position of the selector lever, and
   the second stable state corresponds to a second stable position of the selector lever.

4. The hybrid vehicle according to claim 3, wherein the selector lever has a third stable position in which the transmission is shiftable in steps into a higher or lower gear via actuation of the selector lever in a step-by-step shift gate.

5. The hybrid vehicle according to claim 4, wherein a step-by-step shifting of the transmission via actuation of the selector lever is not possible in the second stable position of the selector lever.

6. The hybrid vehicle according to claim 4, wherein
the first, second, and third stable positions are arranged one behind another in a shift gate of the selector lever,
starting from the first stable position, the selector lever is configured to be shiftable into the second stable position by moving the selector lever in a first direction, and into the third stable position by moving the selector lever in a second direction opposite the first direction or in a second direction perpendicular to the first direction.

7. The hybrid vehicle according to claim 2, wherein
the drive is in a first operating mode as a function of the various driving state parameters and/or vehicle parameters, in which first operating mode the drive is driven solely by the internal-combustion engine or simultaneously by the internal-combustion engine and the electrical machine.

8. The hybrid vehicle according to claim 7, wherein the drive is driven in a second operating mode exclusively by the electric machine.

9. A method of operating a hybrid vehicle equipped with an internal combustion engine, a propulsion-generating electric machine, and a transmission shiftable via a driver operable selecting device into different operating states, the method comprising the acts of:
providing the hybrid vehicle with at least two operating modes that are distinguishable according to a ratio of drive power generated by the electric machine to the drive power generated by the internal-combustion engine;
actuating the selecting device to switch the hybrid vehicle from one operating mode to another operating mode, a first operating mode being when the selecting device is in a first stable state and a second operating mode being when the selecting device is in a different, second stable state;
automatically switching from the second operating mode to the first operating mode without any action of the selecting devices by the driver; and
shifting the selecting device from the second stable state into the first stable state upon the automatic switching from the second operating mode to the first operating mode.

10. The method according to claim 9, wherein
in the first operating mode, the hybrid vehicle is driven either solely by the internal-combustion engine or simultaneously by the internal-combustion engine and the electric machine, and
in the second operating mode, the hybrid vehicle is driven exclusively by the electric machine.

* * * * *